Jan. 3, 1956 M. G. NELSEN 2,729,722
HERMETICALLY SEALED BLOW-OUT CIRCUIT BREAKER
Filed Dec. 6, 1952 2 Sheets-Sheet 1
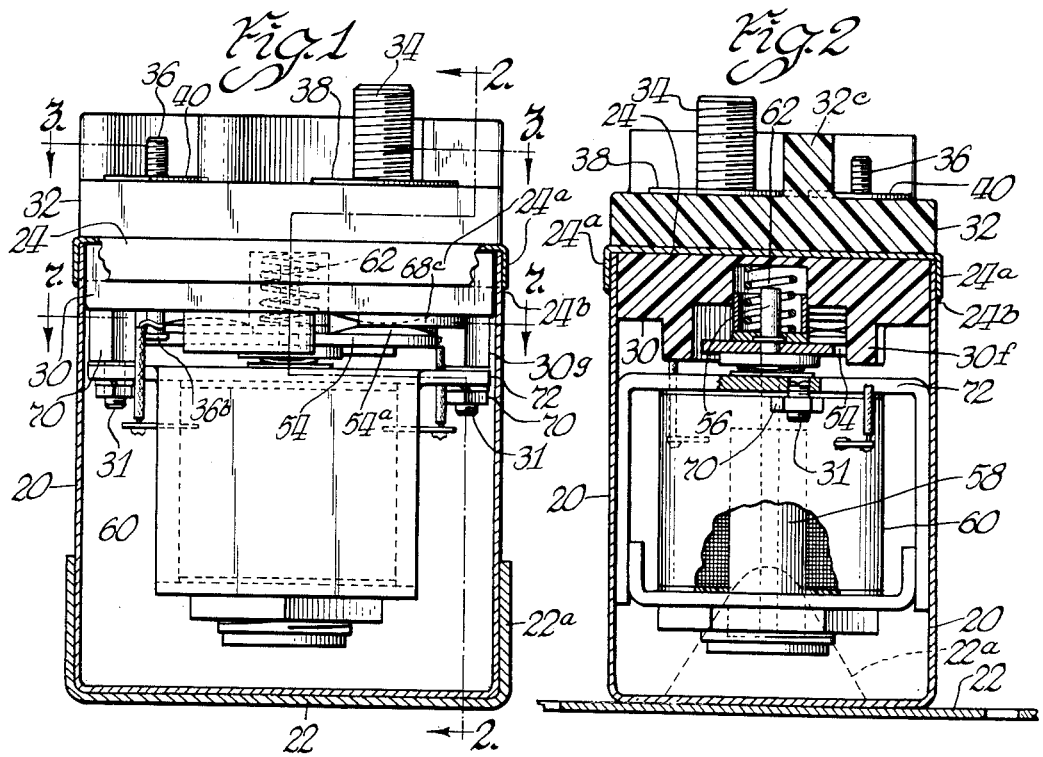
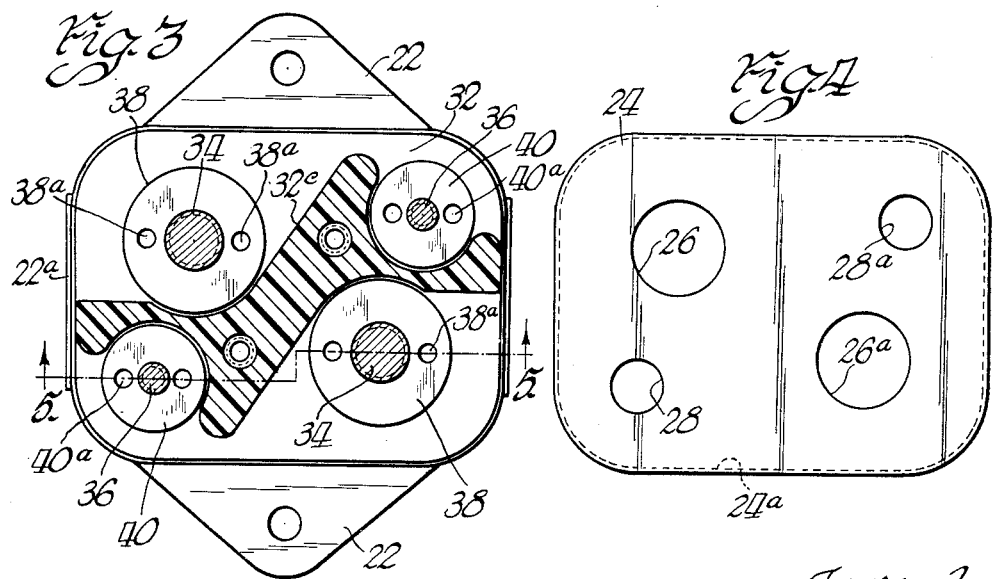
Inventor
Marvin G. Nelsen
by Bair, Freeman & Molinare
Attys.

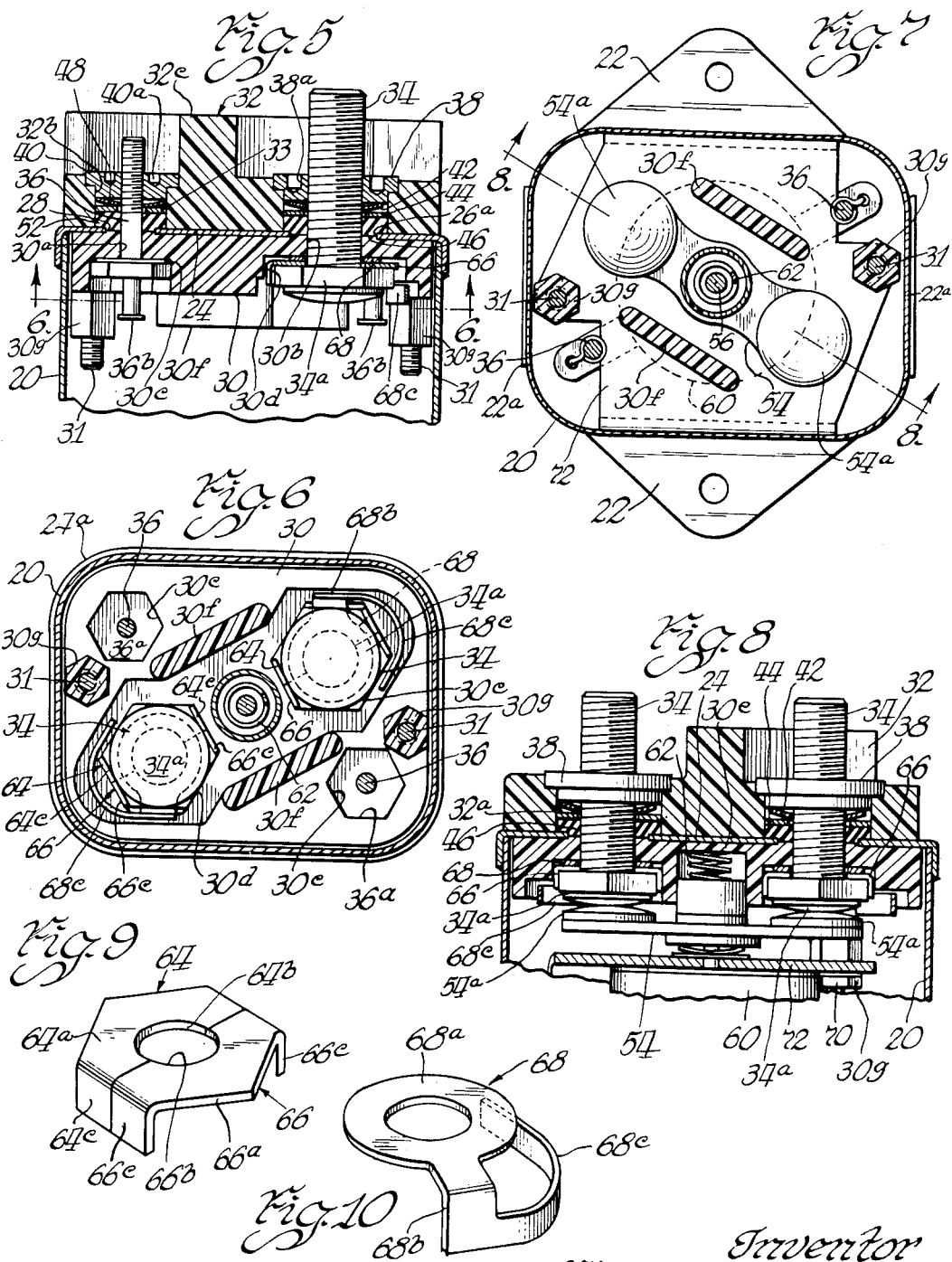

United States Patent Office 2,729,722
Patented Jan. 3, 1956

2,729,722

HERMETICALLY SEALED BLOW-OUT CIRCUIT BREAKER

Marvin G. Nelsen, Skokie, Ill., assignor to Guardian Electric Manufacturing Co., Chicago, Ill., a corporation of Illinois Application December 6, 1952, Serial No. 324,513

1 Claim. (Cl. 200—147)

My invention relates to an improved circuit breaker which is hermetically sealed and yet is of simple and inexpensive construction employing permanent magnet blow-out devices and cooling members integral with the contact members.

Circuit breakers intended for aircraft use are required to withstand highly adverse conditions of operation including great and rapid variations of temperature, air pressure, and humidity. This fact has led to the use of hermetically sealed circuit breakers wherever possible in such applications.

Heretofore no commercially satisfactory hermetically sealed circuit breaker in the large current ratings (i. e.: 200 amperes) has been available because efforts to achieve the necessary seal with the large conductors for such breakers have been unsuccessful. In particular, such large size breakers have exhibited a strong tendency to collect water in the interior of the housing after repeated flights between humid, hot, high pressure landing fields and dry, cold, low pressure high altitude flight.

The circuit breaker of the present invention successfully operates under these adverse conditions without accumulation of water or other undesirable consequences. Briefly, the circuit breaker incorporates an impervious metal can with a cover, the latter having openings to receive the bolts which define the conductors. The metal cover of the can is sandwiched between a pair of insulating plates, the interior plate having sockets to receive the bolt-heads and snugly receiving the bolts and the outer plate receiving the bolts with a substantial clearance. Rubber washers are received on the bolts and extend to the holes in the outer plate and are pressed against the can cover by nuts on the bolts, these nuts also drawing the plates towards each other by bolt tension to grip the cover snugly.

The structure of the present invention further incorporates washer-like permanent magnets and a washer-like baffle, both received under the heads of the conductor-bolts, which blow out and cool the arc to provide efficient and rapid arc extinguishment.

It is, therefore, a general object of the present invention to provide an improved high current capacity hermetically sealed circuit breaker.

Another object of the present invention is to provide an improved high current capacity hermetically sealed circuit breaker wherein tension on the conductors themselves seals the unit.

Still another object of the invention is to provide an improved hermetically sealed high current capacity circuit breaker with permanent magnet blow-out means and integral arc cooling baffles integral with the conductors.

Moreover, it is an object of the present invention to provide an improved high current capacity hermetically sealed circuit breaker of simple, inexpensive, and reliable construction capable of withstanding shocks and vibrations incident to aircraft applications and yet of small size and light weight.

The novel features which I believe to be characteristic of my invention are set forth with particularity in the appended claims. My invention itself, however, both as to its organization and method of operation, together with further objects and advantages thereof, will best be understood by reference to the following description taken in connection with the accompanying drawings, in which:

Figure 1 is a side elevational view of a circuit breaker constructed in accordance with the present invention with the lower portion of the can broken away to show the interior elements;

Figure 2 is a cross-sectional view through axis 2—2, Figure 1;

Figure 3 is a cross-sectional view through axis 3—3, Figure 1;

Figure 4 is a top plane view of the cover member of the circuit breaker of Figure 1;

Figure 5 is a fragmentary cross-sectional view through the axis 5—5, Figure 3;

Figure 6 is a cross-sectional view through the axis 6—6, Figure 5;

Figure 7 is a cross-sectional view through the axis 7—7, Figure 1;

Figure 8 is a fragmentary cross-sectional view through the axis 8—8, Figure 7;

Figure 9 is an enlarged view in perspective of one pair of the arc blow-out magnets of the circuit breaker of Figures 1–8; and Figure 10 is an enlarged view of the arc-extinguishing baffle-washer of the circuit breaker of Figures 1–8.

The circuit breaker shown in the figures consists of a cup or can 20 of metal such as steel. This can is of generally rectangular-shaped cupped construction and receives on its bottom the mounting bracket 22 having triangular parts 22a which are welded to the can to form an integral structure. The top or cover of the can is indicated at 24, Figures 1–4. It is shaped to cover the open end of the can and has marginal down-turned flange 24a which fits snugly about the lip of the can 20. The cover is secured in sealed relation to the can by the bead of solder 24b as shown.

The cover 24 has a series of four openings 26, 26a, 28, and 28a, Figure 4. The former two openings receive the main current carrying conductors whereas the latter two openings receive the solenoid operating conductors. The cover is sandwiched by a pair of inner and outer insulating cover plates, the former indicated at 30, Figures 1 and 2, and the latter at 32. These cover plates have holes to receive the conductor bolts as is described in further detail hereafter.

The construction of the inner insulating cover plate 30 is shown in Figures 2, 5 and 6. As shown, it has openings 30a which register with the openings 28 and 28a of the cover 24 and larger openings 30b which register with the openings 26 and 26a of the cover 24. At the ends of the openings 30a, the cover plate 30 has enlarged hexagonal sockets 30c, Figures 5 and 6. Similarly, at the ends of the openings 30b, the cover plate 30 has enlarged, generally hexagonal sockets 30d. The cover 30 also has a central circular socket 30e, Figure 8, which functions as described hereafter. The space between the sockets 30d, Figure 6, has a pair of downwardly extending flanking baffle members 30f which, as described hereafter, confine the contact-making armature against rotation and electrically shield the armature.

The main current carrying conductors are indicated at 34, Figures 5, 6 and 8. These conductors are in the form of threaded bolts with hexagonally headed inner ends 34a as shown. These heads are of slightly convex shape to define contact buttons as shown in Figure 8. Similarly, the current carrying conductors 36 for the solenoid 60, Figure 2, have hexagonally head inner ends 36a and fit snugly in the inner cover plate 30. These conductors are in the form of bolts but have extending posts 36b protruding downwardly from their heads, these forming convenient surfaces to which the energizing wires to the solenoid are soldered as described hereafter.

The heads 36a fit snugly in the sockets 30c, thus securely holding the conductors 36 against rotation. The heads 34a likewise fit in the sockets 30d but do so with clearance areas as further described hereafter.

The outer insulating cover plate 32 has holes 32a, which mate with the holes 26 and 26a of the cover 24 to receive the conductors 34. Similarly, holes 32b are provided for the conductors 36. These holes receive their respective conductors with substantial clearance and are somewhat larger than the corresponding holes in cover 24, as shown in Figure 5. The cover plate 32 also has an upstanding web, 32c, which, as shown best in Figure 3, partially surrounds each of the conductors 36 and extends between the conductors 34 to minimize the chance of accidental electrical contact.

The conductors 34 and 36 urge the insulating cover plates snugly against the cover 24. In the case of conductors 34 this pressure is applied through the circular nuts 38, which have diametrically opposed sockets 38a to receive a spanner wrench for tightening. These nuts extend in part into the openings 32a and in part rest on the shoulder formed at the upper entrance to openings 32a as shown in Figure 5. Similarly, tension is applied to the conductors 36 by the circular nuts 40, Figures 3 and 5, which have sockets 40a to receive a spanner wrench.

As the nuts 38 and 40 are tightened an air tight seam is formed about the holes 26, 26a, 28 and 28a of the cover 24. This is accomplished, in the case of conductors 34, by the flexible bowed spring washer 42, the flat washer 44, and the rubber sealing washer 46, which are positioned in abutting relation in the annular space between each conductor 34 and the cover plate 32. The rubber washer 46 fits snugly in this annular space in the uncompressed condition so that when compression is applied by the nut 38 it deforms to fill completely the spaces about the openings 26 and 26a to form a tight, secure seal.

Similarly, the bowed washer 48, the flat washer 33 and the rubber washer 52 are sandwiched between the nut 40 and the cover 24 to seal openings 28 and 28a as these nuts are drawn tight.

The contact-making armature is shown at 54, Figure 8. It has a pair of convex upwardly extending buttons 54a which mate with the convex faces of the conductors 34 to establish contact. These buttons, and the bar portion between them, are of conducting material, such as a copper alloy.

The armature 54 is press fitted to a shaft 56 which also carries the magnetic plunger 58, Figure 2. The latter telescopes in the coil 60 so that when the coil carries current the shaft 56, plunger 58, and hence armature 54, move upwardly against their own weight and the bias of compression spring 62, Figure 2, to lift the armature to contact-making position as shown in Figure 8.

When the current flow in winding 60 is discontinued, the armature 54 moves to contact breaking position under the bias of the spring 62 and its own weight. As the contact buttons separate an arc is formed which must be extinguished to deenergize the circuit to which the breaker is connected. This extinguishment is facilitated by the integral magnetic blow-out washers 64 and 66 shown in perspective in Figure 9. As shown, these washers have body portions, 64a and 66a, which together define a hexagon of like conformation with the bolt-heads 34a. The washers also have arcuate cut-out portions 64b and 66b which mate to form an opening to receive the shank portions of the bolts 34. Thus the washers fit under the heads of the bolts 34 as shown in Figures 6 and 8.

The washers 64 and 66 have turned up or axially extending ear portions 64c and 66c located at diametrically opposed faces of the hexagon defined by the washers. These ears are outboard of the hexagon and fit outboard of the heads 34a of the bolts 34. As shown in Figure 8 the ears extend axially of the bolts to locations just short of the bolt-head faces. They fit snugly against the sides of the bolt-heads and against the corresponding sides of the sockets 30d, Figure 6.

The washers 64 and 66 are magnetized in direction to make one mating pair of ears 64c and 66c a positive pole and the other pair a negative pole. The magnetic flux thus produced between the ears fringes to extend across the faces of the bolt-heads and the space outboard thereof. This flux urges the arc in direction transverse to the direction of the field and the direction of current flow, thus tending to lengthen the arc and blow it out.

A cooling baffle is defined by the washer 68 located under the head of each bolt 34 and the magnet washers 64 and 66. This washer, as shown in Figure 10, has an annular washer portion 68a which fits over the stem of the bolt 34 and a radially and axially extending ear portion 68b. A generally arcuate baffle portion 68c is attached to the outboard end of the ear portion 68b and is bent about the bolt heads as shown in Figures 6 and 8.

The baffle washer 68 is of copper or other non-magnetic material having good thermal conductivity. The arc is cooled as it is forced towards one part or another of this baffle and is deionized by reason of this cooling action. As a consequence, interruption of the arc is facilitated.

The configuration of the baffle portion 68c of the washers 68 may be of any one of many shapes. Preferably, however, a shape is chosen that is in the path of the arc movement associated with the magnetic field of the washers 64 and 66.

The operating solenoid 60 is carried from the cover-plate 30 by the depending arms 70a, Figure 1, carry threaded studs 31. Nuts 70 hold the U-shaped support arms 72 in place to secure the solenoid.

Circuit breakers constructed in accordance with the present invention have proven highly successful for aircraft use. For example, a breaker of the following capabilities has been constructed:

| | |
|---|---|
| Maximum operating voltage | 29 v. D.-C. |
| Pickup voltage | 18 v. D.-C. |
| Drop-out voltage | 7 v. D.-C. |
| Load current: | |
| Resistive | 250 amp. |
| Inductive | 100 amp. |
| Operating current | 0.5 amp. |
| Weight | 1⅞ lbs. |

This breaker withstood the following operating cycle:

| | |
|---|---|
| 50 operations | 1600 amp. make and break. |
| 50,000 operations | 1200 amp. make, 200 amp. break. |
| 50 operations | 1600 amp. make and break. |

In the above unit, the covers 30 and 32 were of molded melamine plastic and the washers 46 and 52 of silicone rubber (silastic). The interior of the casing was evacuated and filled with nitrogen. Extensive tests at varying pressures, temperatures, and humidities gave rise to no observable breathing of the casing or accumulation of moisture for any other reason.

While I have shown and described specific embodiment of the invention, it will, of course, be understood that many modifications and alternative constructions may be made without departing from the true spirit and scope of the invention. I therefore intend by the appended claims to cover all such modifications and alternative constructions as fall within their true spirit and scope.

What I claim as new and desire to secure by Letters Patent of the United States is:

In a circuit breaker, an insulating plate having a pair of spaced bolt-receiving holes terminating on their inner margins in bolt-head receiving sockets, electrically conducting bolts in the holes having heads received in the sockets with substantially diametrically opposed clearance spaces substantially in the line between the bolt-heads, magnets having washer portions received under the heads of the bolts and pole portions extending axially of the bolts in the clearance spaces between the sockets and the bolt-heads and terminating at points adjacent the planes of the exposed faces of the bolt-heads, and an armature operable to bridge the exposed faces of the bolt-heads to make and break the circuit, and washers received under the bolt-heads having arc extinguishing wing portions extending through the clearance spaces to protrude beyond the planes of the exposed faces of the bolt-heads and outboard of the space between the bolt-heads.

References Cited in the file of this patent

UNITED STATES PATENTS

| | | |
|---|---|---|
| 1,291,039 | Lowenstein et al. | Jan. 14, 1919 |
| 1,389,141 | James | Aug. 30, 1921 |
| 2,235,429 | Henry et al. | Mar. 18, 1941 |
| 2,237,278 | Willing | Apr. 1, 1941 |
| 2,417,552 | Ilker et al. | Mar. 18, 1947 |
| 2,435,322 | Ponstingl | Feb. 3, 1948 |
| 2,611,059 | Immel et al. | Sept. 16, 1952 |
| 2,650,971 | Dawe | Sept. 1, 1953 |
| 2,677,032 | Wells | Apr. 27, 1954 |